(12) United States Patent
Francis

(10) Patent No.: US 6,488,834 B1
(45) Date of Patent: Dec. 3, 2002

(54) BLADE RE-SHARPENER AND METHOD

(76) Inventor: Clive Alan Francis, 115 Langtons Meadow, Farnham Common, Bucks (GB)

( * ) Notice: Subject to any disclaimer, the term of this patent is extended or adjusted under 35 U.S.C. 154(b) by 0 days.

(21) Appl. No.: 09/634,361

(22) Filed: Aug. 9, 2000

(30) Foreign Application Priority Data

Aug. 10, 1999 (GB) ................................. 9918865

(51) Int. Cl.[7] ........................... C25F 7/00; B23H 9/08
(52) U.S. Cl. .................. 205/652; 205/664; 205/674; 204/224 M; 204/230.5; 204/271
(58) Field of Search ................................ 205/664, 652, 205/674, 224 M, 230.5, 271

(56) References Cited

U.S. PATENT DOCUMENTS

| | | | | |
|---|---|---|---|---|
| 1,721,414 A | * | 7/1929 | Robe | 205/664 X |
| 3,438,880 A | * | 4/1969 | Martin | 205/664 X |
| 3,696,013 A | * | 10/1972 | Tafapolsky | 205/654 X |
| 3,762,243 A | * | 10/1973 | Borrkfield | 205/654 X |
| 4,406,759 A | * | 9/1983 | Saitoh | 205/654 |
| 4,621,669 A | * | 11/1986 | Kiviman | 144/365 |
| 4,710,279 A | * | 12/1987 | Hozer | 205/654 |

FOREIGN PATENT DOCUMENTS

| | | | | |
|---|---|---|---|---|
| CA | 779875 | * | 3/1968 | 205/664 |
| CA | 860918 A | | 4/1971 | |

* cited by examiner

Primary Examiner—Donald R. Valentine
(74) Attorney, Agent, or Firm—Stephen B. Salai, Esq.; Brian B. Shaw, Esq.; Harter, Secrest & Emery LLP

(57) ABSTRACT

A razor blade sharpener utilising the principles of an electrochemical cell. The blade (10) forms an anode (−) and a cathodic plate (16) is provided in close proximity to the razor edge (12) to be sharpened. The present invention electrochemically sharpens the edge (12) of the blade tip (14) to provide a fresh, or "as new" razor blade.

The blade sharpener has additional uses for sharpening, for example, kitchen knifes and surgical blades.

30 Claims, 3 Drawing Sheets

BLADE RE-SHARPENER AND METHOD

TECHNICAL FIELD

The present invention relates to a blade re-sharpener. In particular, it relates to a blade re-sharpener for producing a razor sharp, or "as new" edge on a blade.

BACKGROUND ART

The primary reason for blades becoming blunt is that the extreme edge of the blade bends over. With a cut-throat razor blade, such damage could be corrected with the leather strip. New razor blade heads, however, have their blades surrounded by plastic casings. Such correction of the edge would therefore not be possible.

With continued use, the bent edge will actually break off resulting in a permanently damaged blade. For shaving, such a blade edge is particularly undesirable since shaving with such a blade inevitably results in facial nicks and the like. Therefore it would be usual practice to dispose of such a blade.

Typically, a modern razor blade head will last for a few shaves, and perhaps up to one week of comfortable shaving. Thereafter, the blade, although sharp enough to achieve shave, will not shave as efficiently or as comfortably as when new.

Similar problems occur with other blades, such as those fitted to surgical equipment, and kitchen knives. A means for restoring a clean, sharp edge, which does not require aggressive sharpening with a grinder, for example, would therefore be highly desirable.

DISCLOSURE OF INVENTION

An aim of the present invention is to provide a means for restoring a blade to an "as new" condition thereby prolonging the life of a blade.

A device to achieve this would desirably function on disposable razor blades, blade heads, kitchen knives, surgical blades and other such blades.

The present invention provides a blade sharpener comprising at least part of an electrochemical cell, wherein, in use, an anode thereof is formed by a blade. The blade can be applied to the sharpener with preferably no, but at least substantially no dismantling of the handle, packaging or casing thereof.

Preferably the sharpener is a domestic blade re-sharpener, be they razor blades or kitchen knives. However, the sharpener could be used in an operating theatre for sharpening surgical blades.

Preferably, the blade sharpener comprises a cathodic plate, an electrolyte and a current source connected, in use, to the cathodic plate and the blade, wherein, in use, the electrolyte immerses both the cathodic plate and the edge of the blade to be sharpened. This forms an electrochemical cell. The process of electrolysis lifts the surface off the edge of the blade to remove the bent over portion thereof, thus resulting in a refreshed, or "as new" razor sharp edge.

Preferably, the current source is an external source of current, such as a solar cell, battery or D.C power supply.

Preferably, the blade is a razor blade of a disposable razor head.

Preferably, the anode is formed of a plurality of blades, for example two or three blades in a disposable razor blade head.

Preferably, the cathodic plate is stainless steel or a conductive plastic, or nickel plated copper or solid nickel; little or no electrolytic action, i.e. removal of material, will be experienced by the cathodic plate, and therefore a variety of materials are appropriate. Indeed, the electric circuitry may be formed entirely from conductive plastics, or may even comprise printed circuits. The printed circuits may be conventionally acid etched or may, for example, use conductive inks to make the circuit.

Preferably, the blade sharpener includes a blade holding portion which has insulating means provided thereon to prevent shorting of the electrochemical cell.

Preferably, the electrolyte is a weak solution of sulphuric acid, which will also function as a descaler. Preferably, the electrolyte doubles as a blade sterilizing solution and can have corrosion inhibitors provided therein. The sterilizing substance could be sodium hypochloride. In fact, most ionic solutions will work as the electrolyte equally as well as sulphuric acid.

Two cathodic plates could be provided to sharpen a blade, such as a kitchen knife on two sides thereof. Preferably, the current source would be controlled to switch from one plate to the other plate to provide a uniform sharpening of the blade edge.

Preferably, the gap between the cathodic plates and the blade edge is very small.

In use the current source may be connected to the blade and plate, or plates by means of a spring mounted probe. For a disposable razor blade head, the probe may need to pass through vents provided in the back of the disposable razor blade head.

The current source may be connected to the blade by means of a wire contacting a portion of the front of the blade. For curved blades, the cathodic plate(s) could be made to track/traverse the edge of the blade, or this blade could be made to track/traverse the cathodic plate(s), sharpening at the same time. This allows a disposable razor blade head having a closed back to be sharpened using the present invention. Further, since the connection forming the circuit between the current source and the blade pushes in a direction away from the skin facing surface of the blade, any indentation of the blade caused by the contact against the blade will be in a direction which will not cause potentially hazardous deformation of the blade, such deformations possibly causing skin nicks.

BRIEF DESCRIPTION OF DRAWINGS

Two specific embodiments of the present invention will now be described by way of example with reference to the accompanying drawings, in which.

MODES FOR CARRYING OUT THE INVENTION

Referring now to FIGS. 1A to D, the various stages in the life of a razor blade 10 being processed by the present invention shall now be described.

Figure 1A:
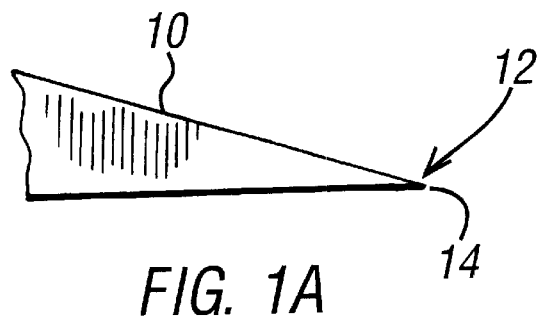
FIGS. 1A to D illustrate the process of sharpening achieved by the present invention.

FIG. 1A shows an "as new" blade edge 12, in section. The edge 12 has a razor sharp tip 14 with no deformations thereon.

Figure 1B:
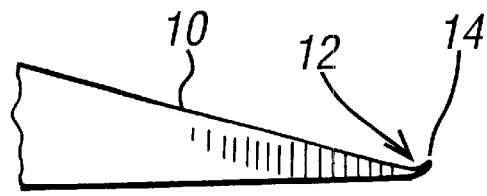

FIG. 1B shows the edge 12 of a razor blade 10 after use thereof. The tip 14 has been deformed by bending.

Figure 1C:
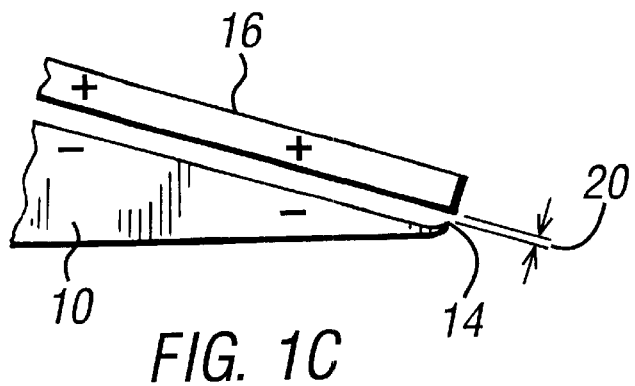

FIG. 1C shows a razor blade 10 and a cathodic plate 16 of the present invention. The razor blade 10 forms an anode (−) and the cathodic plate 16 forms a cathode (+). The two items are immersed in an ionic conductor. This ionic conductor, or electrolyte, may be a weak solution of sulphuric acid, for example. These three components form an electrochemical cell, which will perform electrolysis:

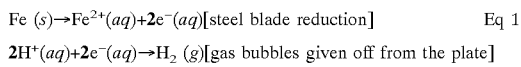

$Fe\ (s) \rightarrow Fe^{2+}(aq) + 2e^-(aq)$ [steel blade reduction]     Eq 1

$2H^+(aq) + 2e^-(aq) \rightarrow H_2\ (g)$ [gas bubbles given off from the plate]

This electrolysis reaction will result in a fresh edge 12 being formed for the blade 10. This is done by means of electrolysis reduction of the anode (−). Typically, a current source 18 to drive the electrochemical cell could be a solar unit producing a current as low 180 mA and a voltage of 400 mV. This current, with a small gap 20 between the anode tip 14 and the cathode (+), could effectively restore the edge of a used razor blade in approximately half an hour.

By using a saturated saline solution for the ionic conductor, a more safe cell is provided. Further, saline solutions are more readily available. A saturated saline solution also makes the sharpening process work better than the sulphuric acid solution as the saline solution works on chrome, nickel and iron elements of the metal blade (as commonly found in modern stainless or hardened steel blades), whereas the acidic electrolyte has been found to work mainly on the iron (Fe) elements of the blade material. Chrome and nickel metals are often added to, for example, razor blade material in order to give, amongst other properties, corrosion protection. Salt in solution is one of only a few substances that can corrode nickel/chrome steels.

Combinations of two or more different electrolyte chemicals may also be used to combine their effects.

Figure 1D:
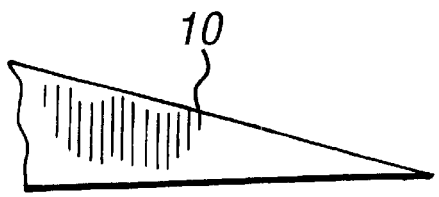

FIG. 1D shows the razor after sharpening with the present invention. The blade has effectively been restored to an "as new" condition.

Corrosion inhibitors could be provided in the electrolyte. Similarly, sterilizing agents and descalers could be used.

Preferably, a blade 10 sharpened with the present invention should be of high quality steel, which blades 10 are less susceptible to corrosion. For example, stainless steel blades are ideal.

Figure 2:
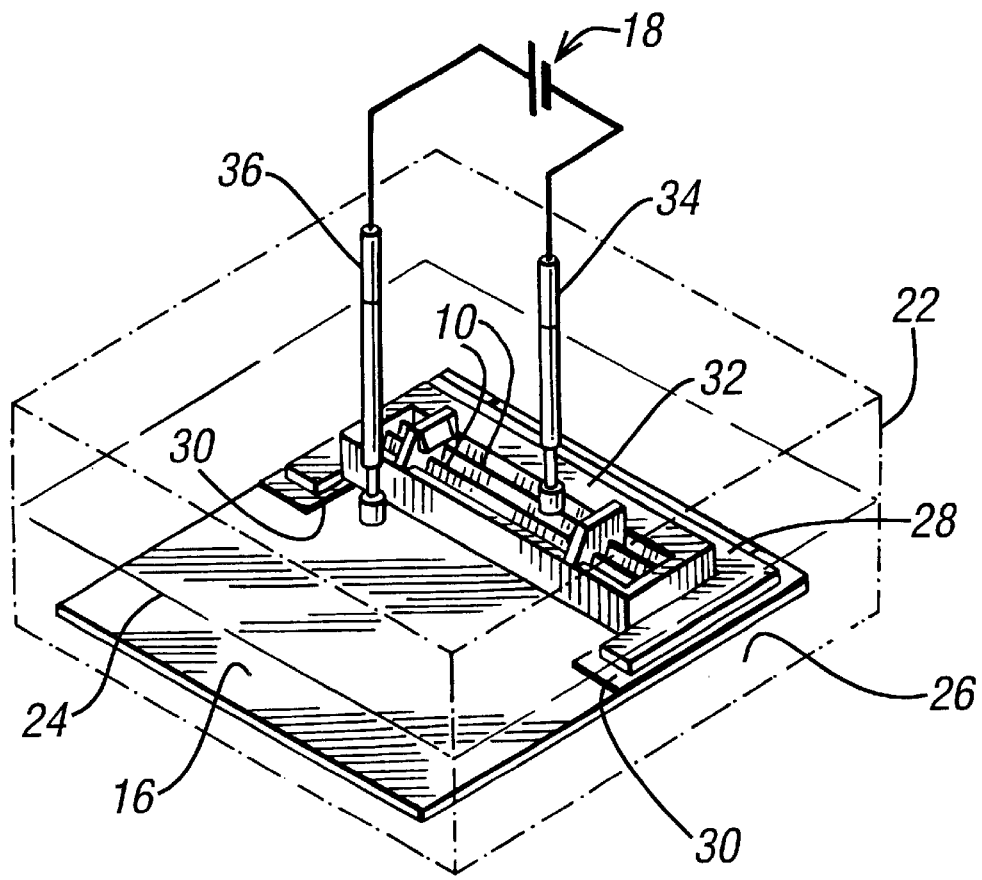
FIG. 2 shows, in perspective, a first embodiment of the present invention for sharpening an open backed disposable razor blade head.

Referring now to FIG. 2, a first embodiment of the present invention will be described. The present invention comprises a vessel 22 with an electrolyte 24 (a solution of sulphuric acid) provided therein. On the base 26 of the vessel 22 there is provided a cathodic plate 16. Mounted onto the cathodic plate 16 there is a blade holder 28. The blade holder 28 is C-shaped and has provided under each arm thereof, extending slightly inward from the arms, insulating strips 30.

The C-shape is sized to encapsulate three sides of a disposable razor blade head 32, with the two insulating strips 30 providing seats for each end of the disposable razor blade head 32. The thickness of the insulating strips 30 determines the size of the gap 20 between a razor blade 10 fitted in the blade holder and the cathodic plate 16.

Instead of being C-shaped, the holder could be provided with a rectangular cut-out or with retaining parts, or with any other means to retain the razor blade head.

A lid of the vessel (not shown) can be closed onto the vessel 22. Two contact probes 34, 36 extend down from the lid of the vessel 22. The first probe 34, connected to a negative side of a current source 18, is connected in circuit with the razor blade 10 through the back of the razor blade head 32, and is biased against the blade 10 by a spring. The second probe 36 is connected to the positive side of a current source 18 and is connected in circuit to the cathodic plate 16.

Instead of providing two contact probes, any direct connection would suffice.

When the cell is completed by immersion in the electrolyte 24, electrolysis will occur. After a predetermined time within the cell, which time can be determined empirically, the razor blade 10 will have been restored to an "as new" condition as shown in FIG. 1D.

Figure 3:
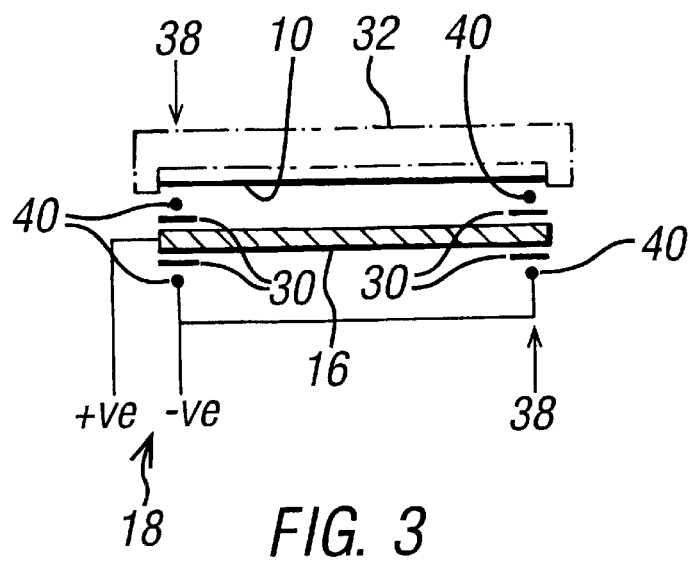
FIGS. 3 and 4 show an alternative universal embodiment for sharpening a closed back razor blade head or other blade.
Figure 4:
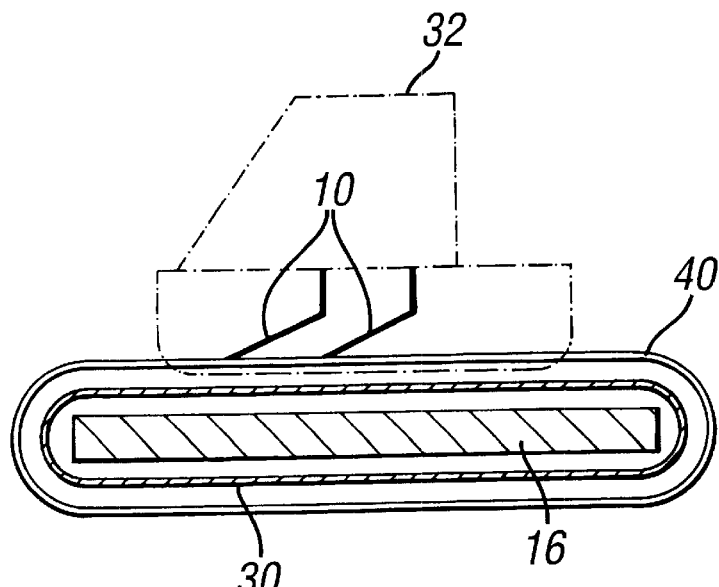

Referring now to FIGS. 3 and 4, a universal blade sharpener is provided. This universal sharpener will function on disposable razor blades of the type suitable for use with the first embodiment and also with disposable razor blade heads which have sealed backs. Clearly the first probe 34 of the first embodiment will not be able to connect in circuit through the back of the razor blade head 32 if the back thereof is sealed.

This universal embodiment comprises a cathodic plate 16. Around two ends 38 of the cathodic plate 46 there are provided insulating layers 30 and wires 40 connected to the negative side of a current source 18. These wires 40 are spaced apart so as to contact only the end portions of the blade 10 to be sharpened on the front thereof. Unfortunately, the blades 10 will not be sharpened in the areas of contact with the wire. However, by means of this "front application" design, many different blades, blade cartridges and disposable razor blade head configurations can be sharpened. In particular, it will sharpen both single, double and treble bladed systems, irrespective of whether they have closed back casings.

This universal embodiment will also work with other blades, such as knives, e.g. kitchen knives, by making the length and shape of the plate 16 correspond with the knife edge's length and shape. The shape and configuration of the plate 16 may also be adapted to sharpen surgical blades fitted to surgical instruments.

An advantage of providing the wire 40 on the outer face of the blades 10 is that any damage caused to the blades by biasing the wires 40 against the blade 10 will cause the blade 10 to deform away from the side of the cutting edge which, in use, would be facing the skin of the user. This provides a built-in safety feature for the device. In the first embodiment, the blade contact is provided to the rear of the blade 10. If the spring bias of the first probe 34 is too great, there is the risk of deforming the blade 10 to an extent that it will potentially cause undesired nicking of the user's face during shaving. Deformation caused by biasing against the front of the blade 10 will not cause such problems.

In some instances, a spring may not be required to hold the blade head or cartridge in contact with the wire 40; the weight of the handle of the razor (or the like) may be sufficient. For an example of this, see FIG. 5 and the discussion thereof below.

In a preferred embodiment, the source of current 18 is a solar cell. This typically will provide a DC current in the region of 180 mA and a voltage of 140 mV. It has been found that this level of current and voltage is sufficient to restore a blade 10 to an "as new" condition within about half an hour. By changing the chemical strength of the electrolyte, the current, the voltage or the gap 20 between the blade 10 and cathodic plate 16, different rates of electrolysis can be achieved and therefore the blade 10 can be sharpened either quicker or slower.

The hydrogen gas generated as a by-product of the sharpening achieved by the present invention is in very low volumes. Therefore, there is little/no danger created by use of the present invention. Similarly, the concentration of the electrolyte chemical, e.g. sulphuric acid, can be very low, so that it also is not significantly dangerous.

Figure 5:
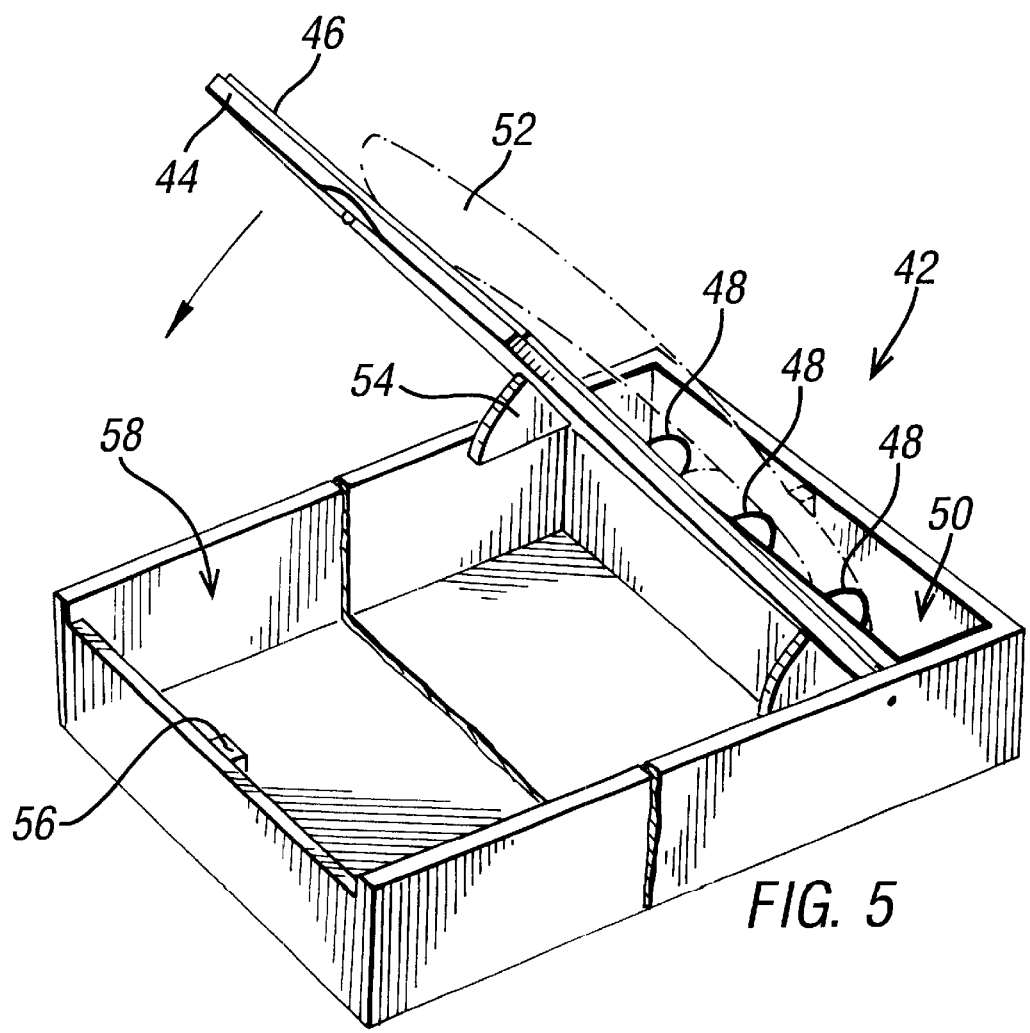
FIG. 5 shows a development of the present invention in which the embodiment of FIGS. 3 and 4 has been incorporated into a shaving box.

Referring now to FIG. 5, there is shown a shaving box 42. The box 42 comprises a hingeable lid 44 into which may be mounted a solar cell 46. The solar cell 46 is connected, by wires 48, to a blade sharpener, such as that disclosed in FIG. 3 and 4. The blade sharpener is fitted to a base of an end portion 50 of the box 42. The end portion 50 is fluid sealed so that an electrolyte can be provided therein. A razor blade, mounted on a handle 52, may be sharpened by placing the blade into the end portion 50, together with electrolyte, so that the blade is appropriately orientated relative to the blade sharpener. The lid can be angled so as best to capture light and so as to angle the handle 52 and blade thereon against the blade sharpener.

The lid 44 may be held in an open position by means of a ratchet mechanism 54 or by a prop (not shown). A latch 56 is provided to keep the lid shut when not in use. A container portion 58 of the box is provided under the lid 44. This container portion 58 may be sized to contain the handle 52 and razor blade, spare razor blades, shaving foam, and the like. The latch 56 keeps the container portion closed.

Although the shaving box disclosed herein has been described with reference to FIG. 5, many features thereof are purely optional, although advantageous. Modifications in detail thereof may, of course, be made within the scope of the invention as defined in the claims.

In a fourth embodiment, not shown, two cathodic plates 16 could be used. One plate 16 would be mounted on each side of the blade 10 for restoring of both edge faces thereof. Clearly, this has desirable benefits for sharpening, for example, kitchen knives. The current may be alternately applied to each cathodic plate 16 in turn so as uniformly to sharpen the blade 10.

Advantages of the present invention are that it not only restores a blunt razor blade to an "as new" condition, but also the sharpening action is non-aggressive. This prolongs the life of the blades by virtue that only minimum amount of the steel of the blade is removed, whereas by aggressive sharpening e.g. by grinding, or with a steel, the blade will quickly wear down.

Further the action of the present invention generally will only remove the high spots of the blade 10 which have been bent over by use. This is since the gap is smaller at these points.

Further, there are no moving parts, or a need to move the blade by hand, which undesirable features would potentially cause a risk to the user.

However the blade needs to be made from a material which is susceptible to electrochemical reaction, i.e. electrolysis. Further, the first embodiment is susceptible to problems if the rear side of the blade cannot be contacted. However, the second embodiment provides a means for sharpening these problematic blades.

It will be appreciated that the present invention could readily be adapted for sharpening blades such as those found in surgical tools.

Preferably, the cathodic plate 16 is made from stainless steel or nichrome. However, it is conceivable that conductive plastics could replace the stainless steel or nichrome cathodic plate 16. This potentially could reduce the cost of the materials required for making the present invention. Further, the device would be lighter. An example of a suitable conductive plastics material is PTS-Thermoflex-EC85/20*9900, provided by PTS Plastic Technology Service Ltd of Flamstone Street, Bishopstone, Salisbury SP5 4BZ, United Kingdom. This material is a thermoplastic elastomer with a Shore A hardness of 80 and good electrical conductivity due to 20% conductive carbon black.

The embodiments of the present invention disclosed herein are specifically suitable for use in the home. The sharpener can non-intrusively sit on a window shelf of a bathroom, for example, and could be used overnight for sharpening a blade prior to use in the morning.

The present invention has been described herein purely by way of example. Modifications in detail may be made within the scope of the invention as defined in the claims.

What is claimed is:

1. A blade re-sharpener comprising:
   a cathodic plate forming a cathode; and
   means to hold a blade adjacente to the cathodic plate, to form an anode such that a gap between the cathodic plate and the blade is very small relative to the size of the blade.

2. A blade re-sharpener according to claim 1, wherein the blade comprises a blade portion of a razor with substantially no dismantling of any handle, packaging or casing thereof.

3. A blade re-sharpener according to claim 1, wherein the blade re-sharpener comprises means for providing an electrolyte and a current source connected, in use, to the cathodic plate and the blade, wherein, in use, the electrolyte immerses both the cathodic plate and the edge of the blade to be sharpened.

4. A blade re-sharpener according to claim 3, wherein the means for providing an electrolyte comprises means for providing a sulphuric acid solution.

5. A blade re-sharpener according to claim 3, wherein the means for providing an electrolyte comprises means for providing a saturated solution.

6. A blade re-sharpener according to claim 3, wherein the means for providing an electrolyte comprises means for providing a blade sterilizing solution.

7. A blade re-sharpener according to claim 6, wherein the means for providing an electrolyte comprises means for providing sodium hypochloride.

8. A blade re-sharpener according to claim 3, wherein the means for providing an electrolyte comprises means for providing corrosion inhibitors.

9. A blade re-sharpener according to claim 3, wherein the current source is a solar cell, a DC power supply or a battery.

10. A blade re-sharpener according to claim 1, wherein the blade is one or more razor blade of a disposable razor head, the anode being formed of the one or more razor blade.

11. A blade re-sharpener according to claim 1 wherein the cathodic plate is made of a conductive plastics material.

12. A blade re-sharpener according to claim 1, comprising a blade holding portion for maintaining the gap, the blade holding portion having insulating means provided thereon to prevent shorting of the electrochemical cell across the gap.

13. A blade re-sharpener according to claim 1, wherein two cathodic plates are provided, one for each side of the blade.

14. A blade re-sharpener according to claim 13, wherein a current source is controlled to switch from one plate to the other plate.

15. A blade re-sharpener according to claim 1, comprising a current source and a spring mounted probe, wherein, in use, the current source is connected to the blade and the cathodic plate by means of the spring mounted probe.

16. A blade re-sharpener according to claim 1, comprising a current source and an electrically conductive wire, wherein the current source, in use, is connected to the blade by means of the wire contacting a portion of the front of the blade.

17. A blade re-sharpener according to claim 1 for a razor blade, comprising a current source and an electrical connector, wherein, in use, the connector forms a circuit between the current source and the blade, the connector pushing the blade in a director away from a skin facing surface of the blade.

18. A shaving box incorporating therein the blade re-sharpener of claim 1.

19. A combination of the shaving box according to claim 18 and a razor having a handle and a blade attachable thereto, the box comprising a lid, wherein the lid can be angled so as to angle the handle, when rested there against, such as to position the blade of the razor against the blade re-sharpener.

20. A blade re-sharpener for re-sharpening a razor blade of a disposable razor blade head comprising:
- a vessel for containing an electrolyte;
- a cathode in the vessel;
- a location for positioning the disposable razor blade head with its blade adjacent the cathode such that the gap between the cathode and the blade is very small relative to the size of the blades; and
- at least one blade contact for contacting the blade of the disposable razor blade head, the contact being connected or connectable to a source of electrical current.

21. A blade re-sharpener for re-sharpening a blade that is mounted onto a handle comprising:
- a vessel for containing an electrolyte;
- a cathodic plate in the vessel; and
- a location for positioning the blade, with its handle, adjacent the cathodic plate such that the gap between the cathodic plate and the blade is very small relative to the size of the blade and
- at least one blade contact for contacting the blade, the contact being connected or connectable to a source of electrical current.

22. A method of re-sharpening a blade comprising providing a blade re-sharpener having a cathodic plate, positioning a blade adjacent to cathodic plate such that the gap between the cathodic plate and a blade is very small relative to the size of the blade; providing an electrolyte for the blade re-sharpener and connecting a power source across the cathodic plate and the blade so that the cathodic plate acts as a cathode and the blade acts as an anode.

23. A method of re-sharpening a blade according to claim 22 wherein the electrolyte comprises sulphuric acid solution.

24. A method of re-sharpening a blade according to claim 22 wherein the electrolyte comprises saturated saline solution.

25. A method of re-sharpening a blade according to claim 22 wherein the electrolyte comprises a blade sterilizing solution.

26. A method of re-sharpening a blade according to claim 22 wherein the electrolyte comprises sodium hypochloride.

27. A method of re-sharpening a blade according to claim 22 wherein the electrolyte comprises corrosion inhibitors.

28. A method of re-sharpening a blade according to claim 22 comprising providing two cathodic plates, one for each side of the blade and a current source, and switching the current source from one plate to the other during re-sharpening.

29. A method of re-sharpening a blade according to claim 22 in which the blade is a razor blade of a disposable razor blade head.

30. A method of re-sharpening a blade according to claim 22 wherein the blade is mounted onto a handle.

* * * * *

UNITED STATES PATENT AND TRADEMARK OFFICE
CERTIFICATE OF CORRECTION

PATENT NO.    : 6,488,834 B1
DATED         : December 3, 2002
INVENTOR(S)   : Clive Alan Francis It is certified that error appears in the above-identified patent and that said Letters Patent is hereby corrected as shown below:

<u>Title page, Item [54] and Column 1, line 1,</u>
Title, "BLADE RE-SHARPENER AND METHOD", should read as
-- BLADE RE-SHARPENER --.

<u>Title page,</u>
Item [30], Foreign Application Priority Data application, number reading "9918865", should read as -- 9918865.8 --.

Signed and Sealed this

Eighth Day of April, 2003

JAMES E. ROGAN
*Director of the United States Patent and Trademark Office*